Aug. 11, 1925.
M. J. PAYNE
TIRE VALVE
Filed July 31, 1920
1,549,213
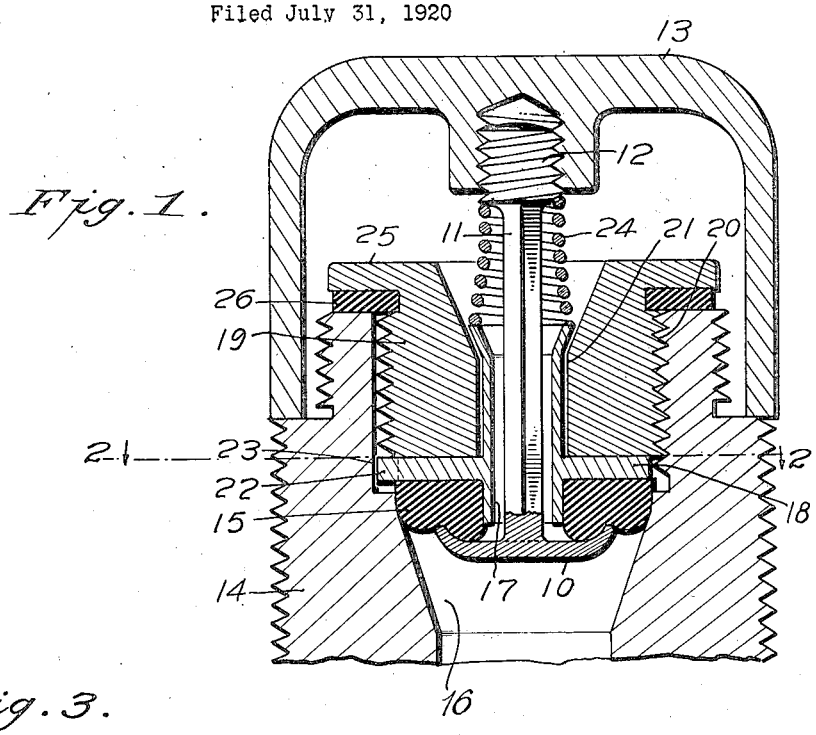
Fig. 1.
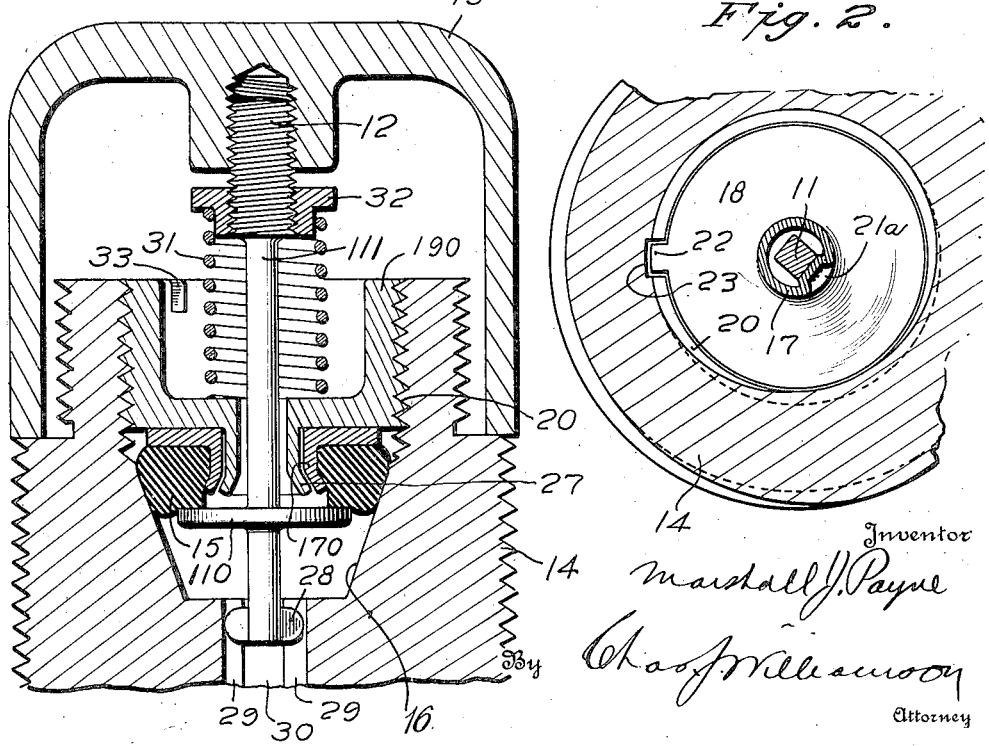
Fig. 3.
Fig. 2.
Inventor
Marshall J. Payne
By Chas J Williamson
Attorney Patented Aug. 11, 1925.

1,549,213

UNITED STATES PATENT OFFICE.

MARSHALL J. PAYNE, OF STAUNTON, VIRGINIA, ASSIGNOR TO THE PAYNE VALVE CORPORATION, OF STAUNTON, VIRGINIA.

TIRE VALVE.

Application filed July 31, 1920. Serial No. 400,433.

*To all whom it may concern:*

Be it known that I, MARSHALL J. PAYNE, citizen of the United States, residing at Staunton, in the county of Augusta and State of Virginia, have invented certain new and useful Improvements in Tire Valves, of which the following is a specification, reference being had therein to the accompanying drawing.

One object of my invention is a valve, such as those used for pneumatic tires, which will have all possible outlets or avenues for escape of air tightly closed when the valve is seated, and another object is to accomplish this desirable result by a construction of few parts which are capable of easy assemblage and whose manipulation in seating the valve and placing it in condition for inflation of the tire may be readily understood and performed. My invention consists in the valve constructed as described by or included within the language or scope of the appended claims or any of them.

In the drawings:

Fig. 1 is a vertical section of a valve embodying my invention;

Fig. 2 is a horizontal section on the line 2—2 of Fig. 1;

Fig. 3 is a vertical section of a different embodiment of my invention.

The valves shown in the drawings to illustrate my invention are of the type in which the valve is held positively to its seat when the tire is inflated and thus does not depend upon the air pressure in the tire for tight seating of the valve, and, as in valves previously patented by me, the valve, 10, has a shank or stem, 11, that extends outwardly and at its outer end has screw threads, 12, which are engaged by threads on a boss on the interior of a rotary cap, 13, which engages a bearing on the outer end of the valve tube, 14, when the cap is turned for coaction of its threads with those of the valve stem to seat the valve.

In both forms of my invention as shown in the drawings, the valve seats against the inner face or side of a gasket, 15, whose external diameter is such that even when not subjected to pressure from the valve it closely or snugly fits the wall of the bore or passage, 16, in the valve tube. That pressure is increased by the radial expansion of the gasket when the valve is pressed against its inner face and thus, by the act of positively seating the valve, the valve itself is held with an air-tight pressure against the gasket and the latter is forced against the wall of the passage by an air-tight pressure, the gasket, of course, on its face or side opposite the valve being in contact with a stationary surface. The hole at the center of the gasket is filled by a tube, 17 (Figs. 1 and 2), of metal or other hard material, which prevents the gasket being squeezed radially inward from the valve pressure and thus not only prevents the contraction of the size of that hole, to the impediment of the inflating air, but assures that all of the radial movement of the gasket under axial compression will be outward and against the wall of the valve tube bore or passage. Said tube, 17, is preferably a part of a washer, 18, that lies over the outer face of the gasket and receives the pressure from the inner end of a plug, 19, that is screwed into the internally threaded enlargement, 20, of the valve tube at the outer end of the latter.

Referring now to that form of my invention shown in Figs. 1 and 2, the tube, 17, is extended thru a central hole, 21, in the plug, 19, but with sufficient space between hole and tube extension to allow the plug to be rotated for screwing and unscrewing purposes without imparting any rotation to the gasket which would be objectionable in that it would tend to wear the periphery of the gasket and thus impair its efficiency in producing a tight joint with the bore of the valve tube. As the tube with its extension may be of thin sheet metal, the extension for a portion of its length may be crimped or flattened to provide on its interior a surface 21ª, to engage a flat side of the valve stem and thereby prevent rotation of the stem when the valve seating cap is rotated to seat or unseat the valve so that the valve stem has only an axial or longitudinal movement. The snug contact of the gasket with the wall of the valve tube bore or passage may afford enough friction to hold the gasket from turning and thereby prevent the turning of the tube, 17, when the valve seating cap is rotated. However, the washer, 18, may have a tooth or key, 22, that enters a slot or groove, 23, in the wall of the bore enlargement, 20, and thereby the tube, 17, and its extension is positively held from turning. The outer end of the tube extension may serve as a bearing for the inner end of the coil spring, 24, whose outer end bears against a shoulder formed by the screw thread on the valve stem, 11, whose function is to yieldingly lift the valve to its seat. The coils of the spring have a pitch which enables the spring to be applied to the stem by screwing it over the stem thread and as the threaded part of the stem is of a diameter small enough for passage thru the interior of the tube, 17, and its extension, the coils of the spring that bear against the outer end of the tube extension are larger in diameter than the remainder so that the proper bearing of the spring against the tube extension will be afforded. The flattening of the side of the tube to engage the flat side of the valve stem may be done after the insertion of the stem thru the tube and its extension. For the convenient screwing and unscrewing of the plug, 19, its outer end may be provided with a flange or head, 25, and between the latter and the outer end of the valve tube a gasket, 26, may be placed. If desired, the upper portion of the extension of tube, 17, may be outwardly flared and the adjacent surface of the hole in the plug correspondingly flared so that the plug and tube extension may be held from accidental separation.

In the form of my invention shown in Fig. 3, the screw plug, 190, has an inward extension or neck, 27, thru which the valve stem, 111, passes and which loosely fits within the gasket tube, 170, so that the plug may be turned without turning the gasket and to hold the plug and gasket together the inner end of the tubular neck, 270, and of the tube, 170, may be outwardly flared. The valve stem in Fig. 3 is prevented from rotating while being free to move axially by radial lugs, 28, on the inner end of the stem that respectively engages grooves, 29, in the side of the bore or passage 30. The valve seating spring, 31, shown in Fig. 3, bears at one end upon the plug, 190, and at the other end upon a collar, 32, screwed on the threaded portion of the valve stem. The plug, 190, has a notch, 33, in its outer end for engagement by a suitable tool to rotate the plug.

The valve may be a simple flat disk 110 as shown in Fig. 3 or it may be cup-shaped as shown in Fig. 1 and the cooperating surface of the gasket may be conformed to the shape of the valve.

Preferably, but not necessarily, the valve is made of metal.

One of the advantages of my invention is the possibility of making valve and valve stem integral and thus a jointed connection between them that might leak air is avoided.

What I claim is:

1. A valve comprising a tube with an internal taper seat, a gasket fitting the seat, a valve whose seat is formed by the inner surface of the gasket, a rotatable screw plug on the opposite side of the gasket, and means that prevent frictional contact of the plug with the gasket when the plug is rotated, said plug when rotated in one direction exerting endwise pressure on the gasket.

2. A valve comprising a valve tube having a valve seat, a valve, a valve stem extending outwardly and having an enlarged threaded portion, a cap to coact with said threaded portion, and a coil spring surrounding the stem and acting to seat the valve, the coils of said spring having a pitch to permit the screwing of the spring over said threaded portion of the stem.

In testimony whereof I hereunto affix my signature.

MARSHALL J. PAYNE.